(12) United States Patent
Takahashi

(10) Patent No.: US 12,288,355 B2
(45) Date of Patent: Apr. 29, 2025

(54) IMAGING DEVICE FOR CALCULATING THREE-DIMENSIONAL POSITION ON THE BASIS OF IMAGE CAPTURED BY VISUAL SENSOR

(71) Applicant: FANUC CORPORATION, Yamanashi (JP)

(72) Inventor: Yuuki Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/551,186

(22) PCT Filed: May 27, 2021

(86) PCT No.: PCT/JP2021/020281
§ 371 (c)(1),
(2) Date: Sep. 18, 2023

(87) PCT Pub. No.: WO2022/249410
PCT Pub. Date: Dec. 1, 2022

(65) Prior Publication Data
US 2024/0193808 A1 Jun. 13, 2024

(51) Int. Cl.
*G06T 7/73* (2017.01)
*B25J 13/08* (2006.01)
*H04N 23/695* (2023.01)

(52) U.S. Cl.
CPC .................. *G06T 7/73* (2017.01); *B25J 13/08* (2013.01); *H04N 23/695* (2023.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,978,598 A | * | 11/1999 | Ishikawa | G03B 5/00 396/50 |
| 7,084,900 B1 | * | 8/2006 | Watanabe | G06T 7/75 348/94 |
| 11,238,297 B1 | * | 2/2022 | Ruepp | G06T 7/73 |
| 2005/0261573 A1 | * | 11/2005 | Satoh | G06V 10/242 600/407 |
| 2007/0297695 A1 | * | 12/2007 | Aratani | G06T 7/73 382/284 |

(Continued)

FOREIGN PATENT DOCUMENTS

| | | |
|---|---|---|
| JP | H11-044900 A | 2/1999 |
| JP | 2009-269110 A | 11/2009 |

(Continued)

*Primary Examiner* — Stefan Gadomski
(74) *Attorney, Agent, or Firm* — HAUPTMAN HAM, LLP

(57) ABSTRACT

This imaging device comprises: an orientation detection unit that detects the orientation of a camera with respect to the direction of gravity; and a parameter setting unit that sets parameters for calculating a three-dimensional position corresponding to a specific position in an image captured by the camera. A storage unit stores setting information for setting parameters corresponding to the orientation of the camera. The parameter setting unit sets parameters on the basis of the direction of gravity, the orientation of the camera, and the setting information.

8 Claims, 6 Drawing Sheets

(56) References Cited

U.S. PATENT DOCUMENTS

| | | | |
|---|---|---|---|
| 2012/0229628 A1* | 9/2012 | Ishiyama | H04N 13/239 |
| | | | 348/135 |
| 2013/0301909 A1* | 11/2013 | Sato | G01B 11/25 |
| | | | 382/154 |
| 2014/0067317 A1* | 3/2014 | Kobayashi | G05D 3/00 |
| | | | 702/153 |
| 2015/0071524 A1* | 3/2015 | Lee | G06T 7/593 |
| | | | 382/154 |
| 2015/0235367 A1* | 8/2015 | Langer | G01S 5/163 |
| | | | 348/135 |
| 2015/0310310 A1* | 10/2015 | Hesch | G06F 18/253 |
| | | | 382/103 |
| 2016/0356596 A1* | 12/2016 | Kitamura | G01B 11/254 |
| 2017/0039718 A1* | 2/2017 | Kotake | G06T 7/73 |
| 2017/0129101 A1* | 5/2017 | Sonoda | B25J 9/1612 |
| 2017/0154430 A1* | 6/2017 | Yoshii | G06V 20/10 |
| 2017/0309037 A1* | 10/2017 | Kongo | D05B 19/12 |
| 2018/0276501 A1* | 9/2018 | Yamada | G06V 10/454 |
| 2018/0352163 A1* | 12/2018 | Ando | H04N 23/63 |
| 2019/0015973 A1* | 1/2019 | Ooba | B25J 9/0093 |
| 2019/0047141 A1* | 2/2019 | Ooba | B65G 43/08 |
| 2019/0099891 A1* | 4/2019 | Tomioka | B25J 9/1697 |
| 2019/0112134 A1* | 4/2019 | Ooba | B65G 43/08 |
| 2019/0225430 A1* | 7/2019 | Ooba | B25J 9/1697 |
| 2019/0308325 A1* | 10/2019 | Higo | B65B 59/02 |
| 2020/0198899 A1 | 6/2020 | Otsuru | |
| 2020/0361092 A1 | 11/2020 | Zhong et al. | |
| 2020/0376689 A1 | 12/2020 | Rembisz et al. | |
| 2021/0037214 A1* | 2/2021 | Itoh | B25J 5/005 |
| 2021/0260758 A1* | 8/2021 | Singh | B25J 9/1651 |
| 2021/0268659 A1* | 9/2021 | Olmstead | B25J 9/1697 |
| 2022/0130147 A1* | 4/2022 | Courteville | G06V 20/52 |

FOREIGN PATENT DOCUMENTS

| | | |
|---|---|---|
| JP | 2011-259314 A | 12/2011 |
| JP | 2014-097572 A | 5/2014 |
| JP | 2017-073753 A | 4/2017 |
| JP | 2018-205023 A | 12/2018 |
| JP | 2020-116687 A | 8/2020 |

* cited by examiner

IMAGING DEVICE FOR CALCULATING THREE-DIMENSIONAL POSITION ON THE BASIS OF IMAGE CAPTURED BY VISUAL SENSOR

RELATED APPLICATIONS

The present application is a National Phase of International Application No. PCT/JP2021/020281 filed May 27, 2021.

TECHNICAL FIELD

The present invention relates to an imaging device that calculates a three-dimensional position based on an image captured by a vision sensor.

BACKGROUND ART

A device that detects a three-dimensional position of a target object by processing an image obtained by capturing an image of the target object with a camera is known in the conventional art. For example, a device that detects the position of a target object from images captured by two cameras included in a stereo camera and performs an operation based on the detected position of the target object is known (e.g., Japanese Unexamined Patent Publication No. 2009-269110A).

An image captured by a camera may be affected depending on a state of the camera when the image is captured by the camera. For example, when a photographer captures an image while holding a camera, the image may be distorted due to camera shake. In the conventional art, it is known to correct the influence when an image is captured by a camera (e.g., Japanese Unexamined Patent Publication No. 11-44900 A and Japanese Unexamined Patent Publication No. 2011-259314 A).

CITATION LIST

Patent Literature

[PTL 1] Japanese Unexamined Patent Publication No. 2009-269110 A
[PTL 2] Japanese Unexamined Patent Publication No. 11-44900 A
[PTL 3] Japanese Unexamined Patent Publication No. 2011-259314 A

SUMMARY OF INVENTION

Technical Problem

It is known to calculate the three-dimensional position of a target object by using a predetermined calculation model in the case of calculating the three-dimensional position based on the position in a two-dimensional image captured by a camera. The calculation model includes various parameters in order to calculate a three-dimensional position from a position in a two-dimensional image.

The camera can image a target object toward various directions. For example, the target object can be imaged in a state in which optical axis of the lens is inclined from the horizontal direction. An actuator of a robot or the like can change the position and orientation of the camera. For example, by attaching a camera to an articulated robot, it is possible to capture images of a target object in various directions and detect the position of the target object. Then, a device equipped with the robot can perform various types of the operation based on the detected position of the target object. Thus, the camera can be moved instead of being fixed in use, thereby increasing the number of types of the operation in which the camera can be used and increasing the value of the camera.

In this regard, when the actuator or the like changes the orientation of the camera, the direction of the visual line of the camera also changes. At this time, the relative positional relationship between the lens and a light-receiving element of the camera may be slightly displaced due to the weight of the camera or the weight of the lens. As a result, the three-dimensional position of the target object may be miscalculated.

The orientation of the camera with respect to a workpiece can be fixed as a method for improving the detection accuracy of the three-dimensional position of the target object. An error in the three-dimensional position can be reduced by setting parameters of the calculation model close to a predetermined orientation of the camera. In other words, it is possible to determine a position and orientation of the camera for imaging a target object and use parameters corresponding to the position and orientation.

On the other hand, if the parameters of the calculation model are not set based on the predetermined position and orientation of the camera, it is difficult to accurately acquire the three-dimensional position of the target object. For example, the orientation of the camera may be changed to any orientation in order to detect the three-dimensional position of the target object. It is necessary to set the parameters of the calculation model in response to each orientation. However, there is a problem that the need for setting an infinite number of parameters make it actually difficult to set the parameters. For this reason, there is a demand for a device that can accurately detect the position of a target object in response to the orientation of a camera with simple control.

Solution to Problem

An imaging device of an aspect of the present disclosure includes a vision sensor configured to image a target object. The imaging device includes a gravity direction detecting unit configured to detect a direction of gravity and an orientation detecting unit configured to detect an orientation of the vision sensor with respect to the direction of gravity. The imaging device includes a parameter setting unit configured to set a parameter for calculating a three-dimensional position corresponding to a specific position in an image captured by the vision sensor, and a storage part configured to store setting information for setting the parameter corresponding to the orientation of the vision sensor. The imaging device includes a feature detecting unit configured to detect a predetermined feature portion in the image of the target object and a feature position calculating unit configured to calculate the three-dimensional position of the feature portion by using the parameter set by the parameter setting unit. The parameter setting unit is configured to set the parameter based on the direction of gravity, the orientation of the vision sensor, and the setting information.

Advantageous Effect of the Invention

According to an aspect of the present disclosure, it is possible to provide an imaging device that accurately detects a three-dimensional position of a target object in response to an orientation of a vision sensor.

DESCRIPTION OF EMBODIMENTS

An imaging device according to an embodiment will be described with reference to FIG. 1 to FIG. 9. The imaging device of the present embodiment functions as a three-dimensional position acquisition device that calculates a three-dimensional position of a specific position in an image based on the image captured by a vision sensor.

Figure 1:
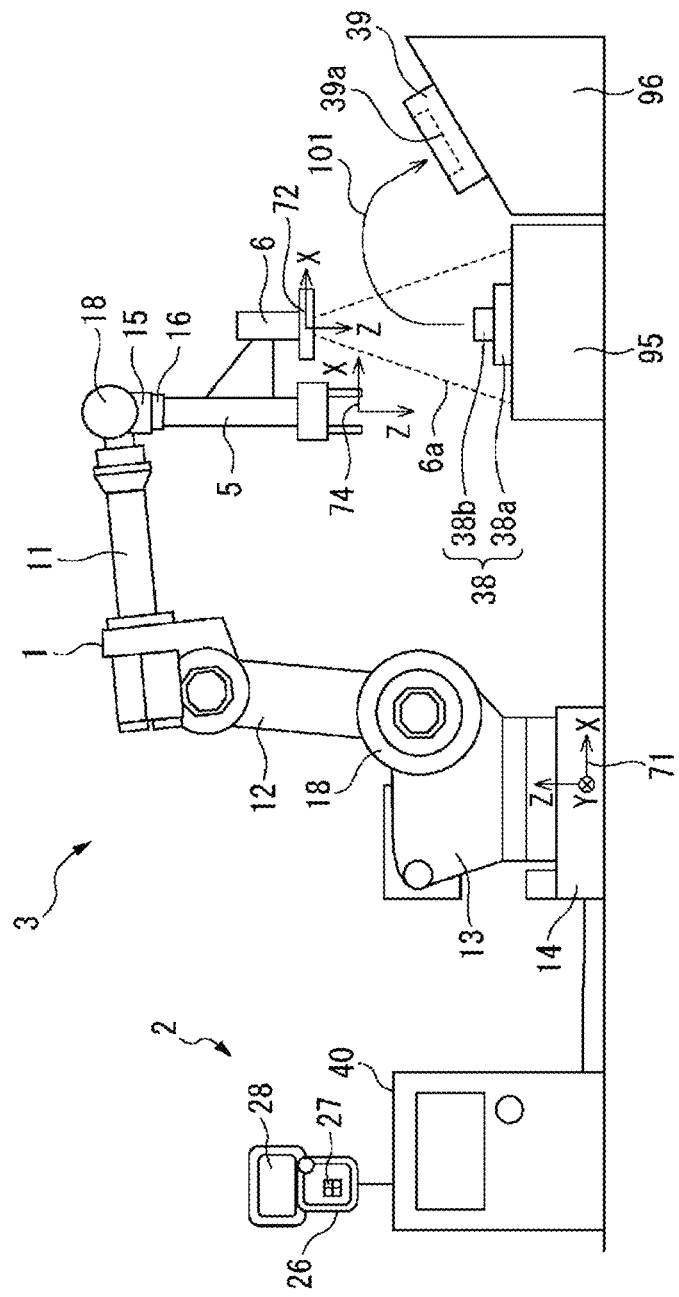
FIG. 1 is a schematic diagram of a robot system according to an embodiment.
Figure 2:
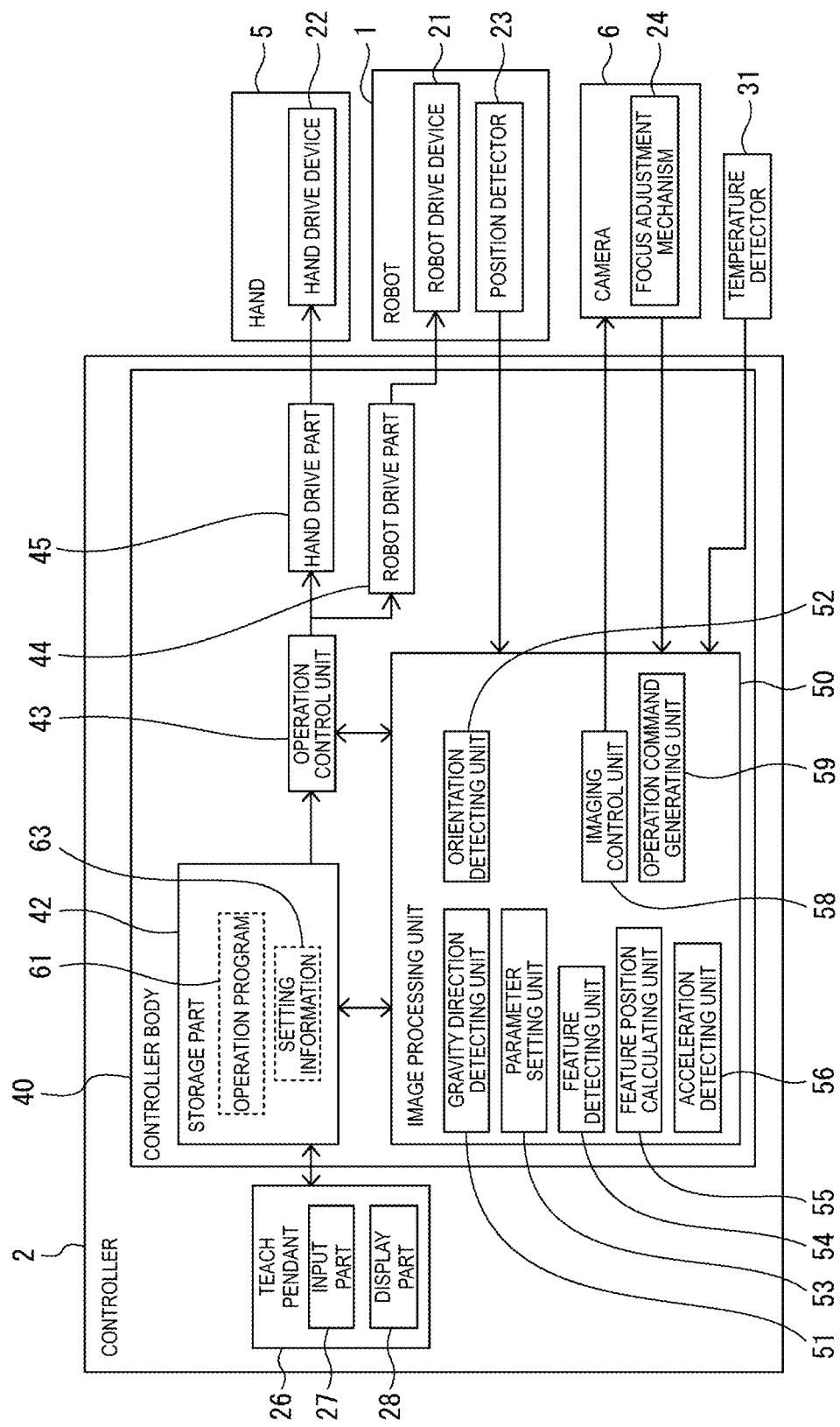
FIG. 2 is a block diagram of the robot system according to the embodiment.

FIG. 1 is a schematic diagram of a robot system including an imaging device according to the present embodiment. FIG. 2 is a block diagram of the robot system according to the present embodiment. Referring to FIG. 1 and FIG. 2, the robot system 3 of the present embodiment detects the position of a first workpiece 38 serving as a target object and grips and transports the first workpiece 38. The robot system 3 also detects the position of a second workpiece 39 serving as a target object and performs an operation of arranging the first workpiece 38 at a recessed portion 39a of the second workpiece 39.

The robot system 3 includes a hand 5 serving as an operation tool that grips a first workpiece 38 and a robot 1 that moves the hand 5. The robot system 3 includes a controller 2 that controls the robot system 3. The robot system 3 also includes a pedestal 95 on which the first workpiece 38 is placed and a pedestal 96 on which the second workpiece 39 is supported. The second workpiece 39 is supported on the pedestal 96 by a predetermined support member.

The hand 5 of the present embodiment is an operation tool that grips and releases the workpiece 38. The operation tool attached to the robot 1 is not limited to this form and any operation tool suitable for an operation performed by the robot system 3 can be adopted. For example, a welding torch for performing welding can be adopted as an operation tool.

The robot 1 of the present embodiment is an articulated robot including a plurality of joints 18. The robot 1 includes an upper arm 11 and a lower arm 12. The lower arm 12 is supported by a swivel base 13. The swivel base 13 is supported by a base 14. The robot 1 includes a wrist 15 connected to an end portion of the upper arm 11. The wrist 15 includes a flange 16 for fixing the hand 5. The components of the robot 1 are formed so as to rotate about a predetermined drive axis. The robot 1 is not limited to this form, and any robot capable of changing the orientation of an operation tool can be adopted.

The robot 1 of the present embodiment includes a robot drive device 21 having drive motors for driving components such as the upper arm 11. The hand 5 includes a hand drive device 22 that drives the hand 5. The hand drive device 22 of the present embodiment drives the hand 5 by air pressure. The hand drive device 22 includes an air pump and a solenoid valve for supplying compressed air to a cylinder.

The controller 2 includes a controller body 40 and a teach pendant 26 through which an operator operates the controller body 40. The controller body 40 includes an arithmetic processing device (a computer) that includes a central processing unit (CPU) serving as a processor. The arithmetic processing device includes a random access memory (RAM), a read only memory (ROM), and the like which are connected to the CPU via a bus. The robot 1 is driven based on operation commands from the controller 2. The robot 1 automatically transports the first workpiece 38 based on an operation program 61.

The controller body 40 includes a storage part 42 that stores any information regarding the robot system 3. The storage part 42 can be formed of a non-temporary storage medium capable of storing information. For example, the storage part 42 can be formed of a storage medium such as a volatile memory, a nonvolatile memory, a magnetic storage medium, or an optical storage medium.

The operation program 61 prepared in advance in order to operate the robot 1 is input to the controller 2. Alternatively, the operator can set a teaching point of the robot 1 by operating the teach pendant 26 and driving the robot 1. The controller 2 can generate the operation program 61 based on the teaching point.

The operation program 61 is stored in the storage part 42. The operation control unit 43 sends an operation command for driving the robot 1 to the robot drive part 44 based on the operation program 61. The robot drive part 44 includes an electric circuit that drives a drive motor and supplies electricity to the robot drive device 21 based on the operation command. The operation control unit 43 sends an operation command for driving the hand drive device 22 to the hand drive part 45. The hand drive part 45 includes an electric circuit for driving an air pump or the like and supplies electricity to the air pump or the like based on the operation command.

The operation control unit 43 corresponds to a processor that is driven according to the operation program 61. The processor is formed so as to be able to read information stored in the storage part 42. The processor functions as the operation control unit 43 by reading the operation program 61 and performing control defined in the operation program 61.

The robot 1 includes a state detector for detecting the position and orientation of the robot 1. The state detector according to the present embodiment includes a position detector 23 attached to the drive motor of each drive axis of the robot drive device 21. The position detector 23 can be formed of, for example, an encoder that detects the rotational position of the output shaft of the drive motor. The position and orientation of the robot 1 are detected from the output of each position detector 23.

A reference coordinate system 71 that does not move when the position and orientation of the robot 1 change is set for the robot system 3. In the example illustrated in FIG. 1, the origin of the reference coordinate system 71 is placed on the base 14 of the robot 1. The reference coordinate system 71 is also called a world coordinate system. In the reference coordinate system 71, the position of the origin is fixed and the directions of the coordinate axes are also fixed. The reference coordinate system 71 has, as coordinate axes, an X axis, a Y axis, and a Z axis that are orthogonal to each other. Also, a W axis is set as a coordinate axis around the X axis. A P axis is set as a coordinate axis around the Y axis. An R axis is set as a coordinate axis around the Z axis.

The teach pendant 26 is connected to the controller body 40 via a communication device. The teach pendant 26 includes an input part 27 for inputting information regarding the robot 1 and the hand 5. The input part 27 is formed of input members such as a keyboard and dials. The teach pendant 26 includes a display part 28 that displays information regarding the robot 1 and the hand 5. The display part 28 can be formed of a display panel capable of displaying information, such as a liquid crystal display panel or an organic electro luminescence (EL) display panel. When the teach pendant includes a display panel of touch panel type, the display panel functions as an input part and a display part.

A tool coordinate system 74 having an origin set at any position on the operation tool is set for the robot system 3. The tool coordinate system 74 changes in position and orientation together with the operation tool. In the present embodiment, the origin of the tool coordinate system 74 is set at the tool center point of the hand 5. The position of the robot 1 corresponds to the position of the tool center point (the position of the origin of the tool coordinate system 74) in the reference coordinate system 71. Also, the orientation of the robot 1 corresponds to the orientation of the tool coordinate system 74 with respect to the reference coordinate system 71.

The robot system 3 according to the present embodiment includes an imaging device that detects the positions of the workpieces 38 and 39. The imaging device includes a camera 6 serving as a vision sensor that captures an image of the workpiece 38. The camera 6 of the present embodiment is a two-dimensional camera that captures a two-dimensional image. The camera 6 is supported by the robot 1. The camera 6 is fixed to the hand 5 via a support member. The camera 6 changes in position and orientation together with the hand 5.

The camera 6 can capture an image in a field of view 6a. The camera 6 has a focus adjustment mechanism 24 for adjusting the focus. The focus adjustment mechanism 24 of the present embodiment has an automatically focusing function. In other words, the camera 6 has an autofocus function. The camera 6 is formed so as to automatically focus on the workpieces 38 and 39 and image the workpieces 38 and 39 when the robot 1 changes in position and orientation. A mechanism for focusing by arbitrary control such as a contrast detection method or a phase difference method can be adopted as the focus adjustment mechanism.

Alternatively, a camera with a liquid lens can be adopted as a vision sensor. In this case, a mechanism for changing the shape of the liquid lens can be adopted as the focus adjustment mechanism. For example, a mechanism for changing a voltage applied to the liquid lens or a mechanism for moving a holding member of the liquid lens for changing a water pressure applied to the liquid lens can be adopted.

In the robot system 3, a camera coordinate system 72 is set for the camera 6 as a sensor coordinate system. The camera coordinate system 72 changes in position and orientation together with the camera 6. The origin of the camera coordinate system 72 is set at a predetermined position on or in the camera 6 such as the lens center or optical center of the camera 6. The camera coordinate system 72 has an X axis, a Y axis, and a Z axis that are orthogonal to each other. The camera coordinate system 72 of the present embodiment is set such that the Z axis extends in a direction parallel to the optical axis of the lens of the camera 6. In the present embodiment, the position and orientation of the camera coordinate system 72 with respect to the tool coordinate system 74 are constant because the camera 6 is fixed to the hand 5.

The imaging device of the present embodiment includes a movement device that moves the camera 6. In the robot system 3, the robot 1 functions as a movement device. When the position and orientation of the robot 1 change, the position and orientation of the camera 6 also change.

The imaging device includes an image processing device that processes an image captured by the vision sensor. In the robot system 3 of the present embodiment, the controller body 40 functions as an image processing device. The controller body 40 includes an image processing unit 50 that processes an image captured by the camera 6. The image processing unit 50 includes an imaging control unit 58 that sends an image capture command to the camera 6.

The image processing unit 50 includes a gravity direction detecting unit 51 that detects a direction of gravity, and an orientation detecting unit 52 that detects the orientation of the camera 6 with respect to the direction of gravity. The image processing unit 50 includes a parameter setting unit 53 that sets parameters for calculating a three-dimensional position corresponding to a specific position in the image captured by the camera 6.

The image processing unit 50 includes a feature detecting unit 54 that detects a predetermined feature portion in the image of each of the workpieces 38 and 39. The image processing unit 50 includes a feature position calculating unit 55 that calculates a three-dimensional position of the feature portion by using the parameters set by the parameter setting unit 53. The image processing unit 50 includes an acceleration detecting unit 56 that detects acceleration of the vision sensor when the robot is driven. The image processing unit 50 includes an operation command generating unit 59 that generates operation commands for the robot 1 and the hand 5 based on the result of image processing.

The image processing unit 50 corresponds to a processor that is driven according to the operation program 61. In particular, each of the gravity direction detecting unit 51, the orientation detecting unit 52, the parameter setting unit 53, the feature detecting unit 54, the feature position calculating unit 55, the acceleration detecting unit 56, the imaging control unit 58, and the operation command generating unit 59 corresponds to a processor that is driven according to the operation program 61. The processor functions as each of the units by reading the operation program 61 and performing control defined in the operation program 61.

Referring to FIG. 1, the robot system 3 of the present embodiment places the workpiece 38 on the surface of the pedestal 95 by using a predetermined method. For example, the operator or another robotic system places the workpiece 38 at a predetermined position on the surface of the pedestal 95. The workpiece 39 is also placed on the surface of the pedestal 96 by a similar method. Then, the robot 1 changes in position and orientation and grips, with the hand 5, the workpiece 38 placed on the top surface of the pedestal 95. The robot system 3 places the workpiece 38 in the recessed portion 39a of the workpiece 39 by changing the position and orientation of the robot 1 as indicated by an arrow 101. The workpieces 38 and 39 with the workpiece 38 placed at the recessed portion 39a are transported by a predetermined method. For example, the operator or another robotic system transports the workpieces 38 and 39 to predetermined positions.

Incidentally, when the workpiece 38 is placed on the surface of the pedestal 95, the position of the workpiece 38 on the pedestal 95 may be displaced. In the example illustrated in FIG. 1, a reference position of the workpiece 38 is determined in teaching work for teaching the position and orientation of the robot 1. The reference position is a position where it is desirable to place the workpiece 38. However, when the workpiece 38 is actually placed on the top surface of the pedestal 95, the workpiece 38 may be placed at a position displaced from the reference position. Similarly, when the workpiece 39 is placed on the surface of the pedestal 96, the workpiece 39 may be displaced from a reference position determined in the teaching work. Each of the workpieces 38 and 39 also has dimensional errors. The robot system 3 of the present embodiment detects the three-dimensional positions of the workpieces 38 and 39 based on images captured by the camera 6.

In the robot system 3 of the present embodiment, when the first workpiece 38 is gripped, the camera 6 captures an image of the workpiece 38. The image processing unit 50 calculates a three-dimensional position of the workpiece 38 based on the image of the workpiece 38. The image processing unit 50) controls the position and orientation of the robot 1 so as to correspond to the position of the workpiece 38. Then, the image processing unit 50 changes the position and orientation of the robot 1 and grips the workpiece 38 with the hand 5.

Also, when the first workpiece 38 is placed in the recessed portion 39a of the second workpiece 39, control for detecting the three-dimensional position of the workpiece 39 is performed in the same manner as the control for detecting the three-dimensional position of the workpiece 38. The camera 6 captures an image of the workpiece 39. The image processing unit 50 calculates a three-dimensional position of the workpiece 39 based on the image of the workpiece 39. The image processing unit 50 calculates the position and orientation of the robot 1 for placing the workpiece 38 in the recessed portion 39a of the workpiece 39. The image processing unit 50 changes the position and orientation of the robot 1 and places the workpiece 38 in the recessed portion 39a of the workpiece 39. After this, the hand 5 releases the workpiece 38 and the robot 1 returns to the position and orientation at the start of the operation.

Figure 3:
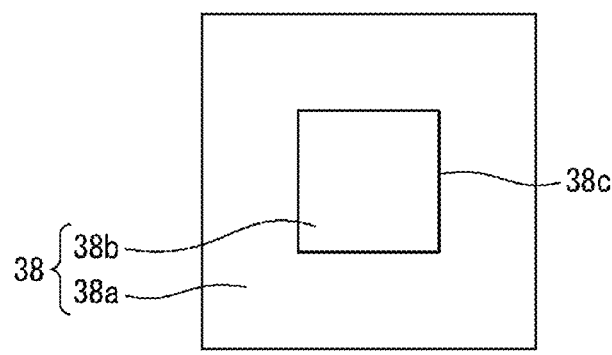
FIG. 3 is a plan view of a first workpiece according to the embodiment.

FIG. 3 illustrates a plan view of the first workpiece according to the present embodiment. Referring to FIG. 1 and FIG. 3, the workpiece 38 includes a plate-like portion 38a and a plate-like portion 38b formed on the plate-like portion 38a. The plate-like portions 38a and 38b each have a rectangular parallelepiped shape. The plate-like portion 38b has an edge portion 38c on the outer periphery of a top surface thereof. The edge portion 38c is a portion corresponding to a corner formed in the plate-like portion 38b. In the present embodiment, the edge portion 38c is a feature portion of the workpiece 38.

Referring to FIG. 1, when the workpiece 38 is gripped, the camera 6 is arranged vertically above the workpiece 38 in the present embodiment. At this time, the distance from the surface of the workpiece 38 on which the feature portion is formed to the camera 6 is predetermined. In this example, the position and orientation of the robot 1 are controlled such that the position of the top surface of the plate-like portion 38b has a predetermined Z axis value in the camera coordinate system 72. Also, the orientation of the camera 6 is adjusted such that the optical axis of the lens of the camera 6 is substantially perpendicular to the surface of the plate-like portion 38b having the feature portion of the workpiece 38.

Figure 4:
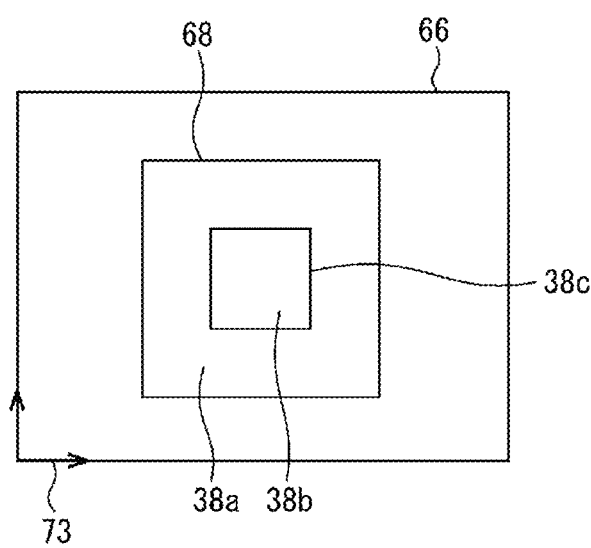
FIG. 4 is an example of an image when the first workpiece is imaged.

FIG. 4 illustrates an example of an image of the first workpiece captured by the camera. The camera 6 performs focusing and captures an image 66. The image 66 includes an image 68 of the first workpiece 38. An image coordinate system 73 is set for the image 66 captured by the camera. The feature detecting unit 54 of the image processing unit 50 detects the edge portion 38c as a feature portion of the workpiece 38 by performing pattern matching. A reference image for detecting the position of the edge portion 38c in pattern matching is created in advance and stored in the storage part 42. The feature detecting unit 54 detects the edge portion 38c serving as a feature portion in the image captured by the camera 6, by using the reference image.

The feature position calculating unit 55 calculates the position of the feature portion of the workpiece 38 in the image captured by the camera 6. For example, the position of a corner of the edge portion 38c in the image 68 is detected by using coordinate values of the image coordinate system 73. The feature position calculating unit 55 detects the three-dimensional position of the feature portion by using a calculation model based on the position of the feature portion in the image. Such a position of the feature portion of the workpiece 38 can be calculated in the reference coordinate system 71. Further, the feature position calculating unit 55 calculates the position of the workpiece 38 based on the three-dimensional position of the feature portion of the workpiece 38. The position of an arbitrary set point that is set for the workpiece 38 can be calculated as the position of the workpiece 38. The position of the workpiece 38 can also be calculated in the reference coordinate system 71.

The operation command generating unit 59 calculates the position and orientation of the robot 1 based on the three-dimensional position of the workpiece 38 calculated by the feature position calculating unit 55. Then, the position and orientation of the robot 1 for gripping the workpiece 38 are sent to the operation control unit 43. The operation control unit 43 drives the robot 1 and the hand 5 so as to grip the workpiece 38 based on an operation command received from the operation command generating unit 59.

Figure 5:
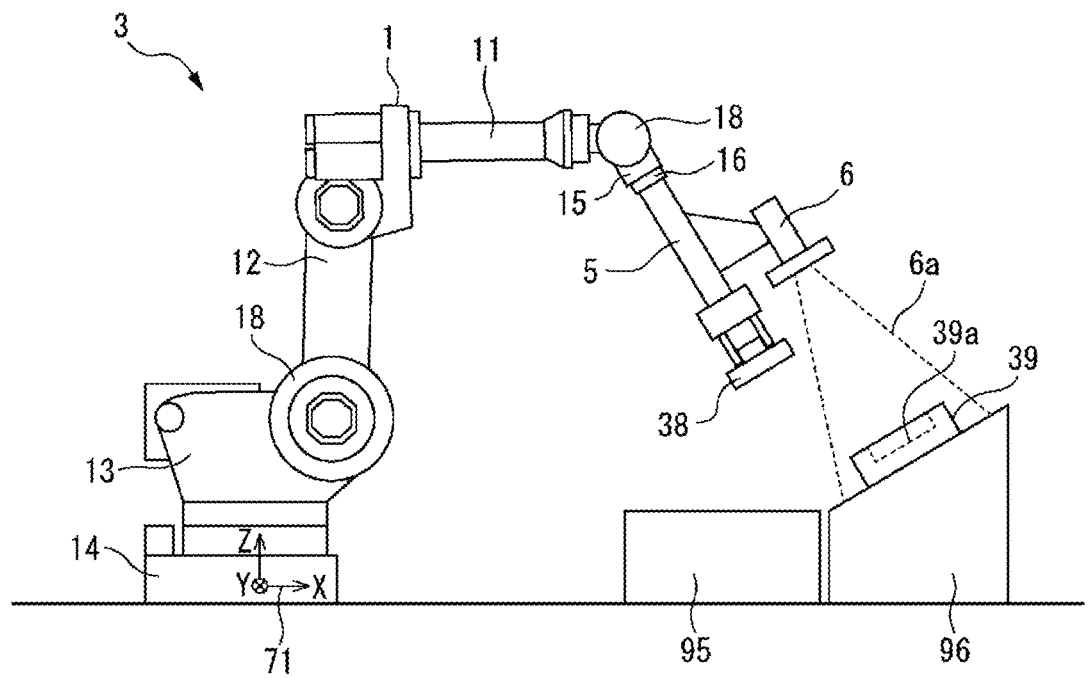
FIG. 5 is a schematic diagram of the robot system when a second workpiece is imaged.

FIG. 5 illustrates a schematic diagram when the robot system places the first workpiece in the recessed portion of the second workpiece. Also, when the first workpiece 38 is placed in the recessed portion 39a of the second workpiece 39, the same control as the control for gripping the first workpiece 38 is performed. The operation control unit 43 changes the position and orientation of the robot 1 after gripping the first workpiece 38 with the hand 5. The robot 1 places the camera 6 at a position and orientation for imaging the second workpiece 39.

Figure 6:
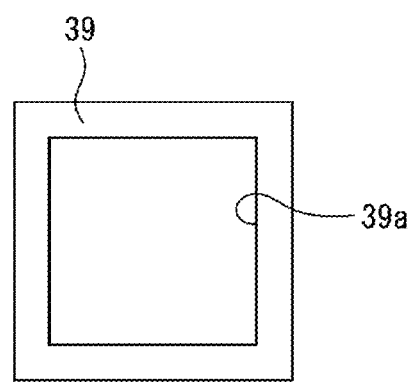
FIG. 6 is a plan view of the second workpiece according to the embodiment.

FIG. 6 illustrates a plan view of the second workpiece according to the present embodiment. Referring to FIG. 5 and FIG. 6, the second workpiece 39 has a rectangular parallelepiped shape. A top surface of the workpiece 39 is planar. The recessed portion 39a corresponding to the shape of the plate-like portion 38a of the first workpiece 38 is formed on the top surface of the workpiece 39. A stepped portion of the recessed portion 39a of the second workpiece 39 becomes a feature portion when the image is captured by the camera 6.

Figure 7:
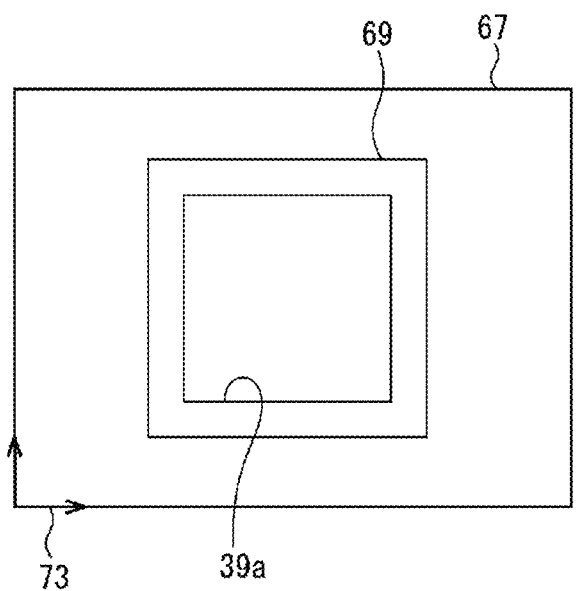
FIG. 7 is an example of an image when the second workpiece is imaged.

FIG. 7 illustrates an example of an image of the second workpiece captured by the camera. The image 67 includes an image 69 of the top surface of the second workpiece 39. Referring to FIG. 5 to FIG. 7, the distance from the top surface of the workpiece 39, on which the feature portion is formed, to the camera 6 when the second workpiece 39 is imaged is predetermined. The Z axis position of the top surface of the workpiece 39 in the camera coordinate system 72 is predetermined. Also, the orientation of the camera 6 is adjusted such that the optical axis of the lens of the camera 6 is substantially perpendicular to the top surface of the workpiece 39 having the feature portion. Such a reference position and orientation of the robot 1 are predetermined.

Referring to FIG. 2, FIG. 5, and FIG. 7, the feature detecting unit 54 of the image processing unit 50 detects the recessed portion 39a serving as a feature portion of the workpiece 39 by performing pattern matching. A reference image for detecting the recessed portion 39a is created in advance and stored in the storage part 42. The feature position calculating unit 55 calculates the three-dimensional position of the feature portion of the workpiece 39 by using a calculation model based on the position of the feature portion in the image 69 captured by the camera 6. For example, the feature position calculating unit 55 can calculate the three-dimensional position of a corner of the planar shape of the recessed portion 39a. Then, the feature position calculating unit 55 can calculate the three-dimensional position of the workpiece 39 based on the three-dimensional position of the feature portion.

The operation command generating unit 59 calculates the position and orientation of the robot 1 based on the position of the second workpiece 39 calculated by the feature position calculating unit 55. The operation command generating unit 59 calculates the position and orientation of the robot 1 for placing the first workpiece 38 in the recessed portion 39a of the second workpiece 39. Then, the operation command generating unit 59 transmits the position and orientation of the robot 1 for placing the workpiece 38 in the recessed portion 39a of the workpiece 39 to the operation control unit 43. Based on an operation command received from the operation command generating unit 59, the operation control unit 43 drives the robot 1 and the hand 5 so as to place the first workpiece 38 in the recessed portion 39a of the second workpiece 39.

In the control for transporting a workpiece according to the present embodiment, the feature detecting unit 54 detects a feature portion, and the feature position calculating unit 55 accurately calculates three-dimensional positions of the workpieces 38 and 39 based on the position of the feature portion. Thus, the robot system 3 can accurately grip the workpiece 38 and place the workpiece 38 in the recessed portion 39a of the workpiece 39. The robot system 3 can accurately grip the workpiece 38 even if the position of the workpiece 38 on the pedestal 95 is displaced from the reference position or the workpiece 38 has dimensional errors. It is also possible to accurately place the workpiece 38 in the recessed portion 39a of the workpiece 39 even when the position of the workpiece 39 on the pedestal 96 is displaced from the reference position or the workpiece 39 has dimensional errors.

The feature position calculating unit 55 of the present embodiment calculates a three-dimensional position from a specific position in a two-dimensional image by using a predetermined calculation model. In this regard, when the orientation of the camera changes, the relative positional relationship of a light-receiving element of the camera with respect to the lens may change due to the influence of the own weight applied to the camera and the own weight of the lens. Also, in the case of a camera including a liquid lens, the shape of the lens may change in response to the change in the orientation of the camera. As a result, the three-dimensional position for the specific position in the two-dimensional image captured by the camera 6 may change, and the three-dimensional position of the target object may not be accurately calculated.

The image processing unit 50 of the present embodiment has a function of correcting the three-dimensional position by taking into account the orientation of the camera 6. Setting information 63 for setting parameters corresponding to the orientation of the camera 6 is predetermined. The setting information 63 is stored in the storage part 42. The parameter setting unit 53 calculates parameters of a calculation model for calculating the three-dimensional position of a feature portion from the position of the feature portion in an image captured by the camera 6, based on the direction of gravity, the orientation of the camera 6, and the setting information 63. The feature position calculating unit 55 calculates the three-dimensional position of the feature portion on the surface of the workpiece by using the parameters set corresponding to the orientation of the camera 6. Further, in the present embodiment, when the orientation of the camera 6 changes, the parameter setting unit 53 changes the values of the parameters in response to the orientation of the camera 6.

Subsequently, a calculation model for calculating a three-dimensional position in space from a specific position in an image captured by a camera will be described. A position in an image captured by the camera corresponding to any position in space is generally represented by the following equation (1) by using a pinhole camera model.

[Math. 1]

$$\underset{\substack{\text{Position}\\\text{on image}}}{\begin{bmatrix} u \\ v \\ 1 \end{bmatrix}} = \underset{\substack{\text{Intrinsic}\\\text{parameter}\\\text{matrix}}}{\begin{bmatrix} f_x & 0 & c_x \\ 0 & f_y & c_y \\ 0 & 0 & 1 \end{bmatrix}} \underset{\substack{\text{Extrinsic}\\\text{parameter}\\\text{matrix}}}{\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}} \underset{\substack{\text{Three-}\\\text{dimensional}\\\text{position}}}{\begin{bmatrix} X \\ Y \\ Z \\ 1 \end{bmatrix}} \quad (1)$$

[u, v]: Coordinate values of camera coordinate system
$f_x$, $f_y$: Product of focal length and effective pixel size
$c_x$, $c_y$: Image center
[X, Y, Z]: Coordinate values of reference coordinate system In the present embodiment, the coordinate values (X, Y, Z) of the three-dimensional position are expressed in the reference coordinate system 71. The coordinate values (u, v) of the position in the image are expressed in the image coordinate system 73. The extrinsic parameter matrix is a transformation matrix for transforming a three-dimensional position in space into coordinate values in the camera coordinate system 72. The intrinsic parameter matrix is a matrix for transforming coordinate values in the camera coordinate system 72 into coordinate values in the image coordinate system 73 in the image. In this case, the Z axis value of the three-dimensional position in the reference coordinate system 71 or the Z axis coordinate value in the camera coordinate system 72 is predetermined, corresponding to the distance from the camera to the workpiece.

The above equation (1) is an ideal example in which there is no lens distortion or the like. In practice, parameter changes due to lens distortion or the like are taken into account. The computation of a part of equation (1) corresponding to the three-dimensional position in space and the extrinsic parameter matrix can be expressed by the following equation (2).

[Math. 2]

$$\begin{bmatrix} x \\ y \\ z \end{bmatrix} = R \begin{bmatrix} X \\ Y \\ Z \end{bmatrix} + t \quad (2)$$

t: $[t_1, t_2, t_3]$
R: 3×3 rotation matrix

The coordinate values (X, Y, Z) expressed in the reference coordinate system 71 can be transformed into the coordinate values (x, y, z) expressed in the camera coordinate system 72 by using equation (2). Next, a variable x' and a variable y' are defined as shown in the following equation (3) and equation (4) in order to take into account lens distortion of the camera. Further, a variable x" and a variable y" that take distortion into account are calculated as shown in equation (5) and equation (6). In this regard, the relationship between the variable x', the variable y', and a variable r is as shown in equation (7).

[Math. 3]

$$x' = x/z \quad (3)$$

$$y' = y/z \quad (4)$$

$$x'' = x' \frac{1 + k_1 r^2 + k_2 r^4 + k_3 r^6}{1 + k_4 r^2 + k_5 r^4 + k_6 r^6} + 2p_1 x'y' + p_2(r^2 + 2x'^2) \quad (5)$$

$$y'' = y' \frac{1 + k_1 r^2 + k_2 r^4 + k_3 r^6}{1 + k_4 r^2 + k_5 r^4 + k_6 r^6} + p_1(r^2 + 2y'^2) + 2p_2 x'y' \quad (6)$$

$$r^2 = x'^2 + y'^2 \quad (7)$$

In equation (5) and equation (6), coefficients $k_1$ to $k_6$ are coefficients relating to lens distortion in the radial direction and coefficients $p_1$ and $p_2$ are coefficients relating to lens distortion in the circumferential direction. The variables x" and y" that take lens distortion into account are used, whereby the coordinate values (u, v) of the image coordinate system 73 in the image can be calculated as shown in the following equation (8) and equation (9). Equation (8) and equation (9) are a part corresponding to a computation using the intrinsic parameter matrix in the above equation (1).

[Math. 4]

$$u = f_x \cdot x'' + c_x \quad (8)$$

$$v = f_y \cdot y'' + c_y \quad (9)$$

The above description describes a method of calculating a position in an image from a three-dimensional position in space. However, in the present embodiment, based on the above relationship, a three-dimensional position (X, Y, Z) in space is calculated based on the coordinate values (u, v) of the position in the image and the distance from the camera 6 to each of the workpieces 38 and 39 in the camera coordinate system 72 (the Z axis coordinate values in the camera coordinate system 72). The distance from the camera 6 to the workpiece 38 can be predetermined and stored in the storage part 42. The feature position calculating unit 55 calculates a three-dimensional position (X, Y, Z) in space from the coordinate values (u, v) of a specific position in the image based on the calculation model.

In this regard, with reference to equation (2) to equation (9), the calculation model for calculating a three-dimensional position from a position in the image requires products $f_x$ and $f_y$, which are variables f corresponding to the product of the focal length and the effective image size, an image center $c_x$, $c_y$ which are variables c corresponding to the image center, and coefficients $k_1$ to $k_6$ and $p_1$ and $p_2$ which are variables k and p corresponding to coefficients relating to distortion. These parameters of the calculation model depend on the orientation of the camera 6. In other words, the parameters of the calculation model depend on the orientation of the camera with respect to the direction of gravity. Alternatively, the parameters of the calculation model depend on a force (acceleration) acting on the camera such as gravity.

Figure 8:
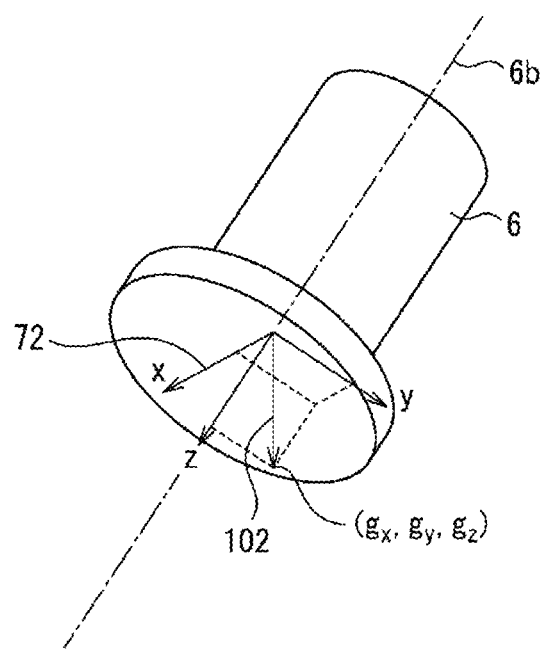
FIG. 8 is a perspective view of a camera for explaining a camera coordinate system and a direction of gravity.

FIG. 8 illustrates a perspective view of the camera for explaining the orientation of the camera coordinate system with respect to the direction of gravity. In the present embodiment, the camera coordinate system 72 is set such that the Z axis of the camera coordinate system 72 overlaps the optical axis 6b of the lens. In the present embodiment, the orientation of the camera coordinate system 72 is used to express the orientation of the camera with respect to the direction of gravity. A direction indicated by an arrow 102 is the direction of gravity, and the camera coordinate system 72 is inclined with respect to the direction of gravity.

The gravity direction detecting unit 51 detects the direction of gravity. In the present embodiment, coordinate values indicating the direction of gravity in the reference coordinate system 71 are stored in advance in the storage part 42. The gravity direction detecting unit 51 acquires the coordinate values of the reference coordinate system 71 indicating the direction of gravity from the storage part 42. Alternatively, a gravity sensor can be disposed on the wrist or the like of the robot whose orientation changes together with the camera. The gravity direction detecting unit 51 can detect the direction of gravity based on an output of the gravity sensor. Also, the camera may include a gravity sensor. In this case, the gravity direction detecting unit 51 may detect the direction of gravity from the gravity sensor of the camera.

The orientation detecting unit 52 detects the orientation of the camera 6 with respect to the direction of gravity based on the position and orientation of the robot 1 and a position on the robot 1 at which the camera 6 is attached. The camera 6 of the present embodiment is fixed to the hand 5. The position of the camera 6 on the robot 1 and the orientation thereof with respect to the hand 5 are constant. Thus, the orientation detecting unit 52 calculates the position and orientation of the camera coordinate system 72 based on an output of the position detector 23. The position and orientation of the camera coordinate system 72 can be expressed by using coordinate values of the reference coordinate system 71. Alternatively, the orientation detecting unit 52 calculates the position and orientation of the tool coordinate system 74 by using the reference coordinate system 71 based on the output of the position detector 23. Then, the orientation detecting unit 52 may calculate the position and orientation of the camera coordinate system 72 from the position and orientation of the tool coordinate system 74.

Subsequently, the orientation detecting unit 52 calculates the orientation of the camera coordinate system 72 with respect to the direction of gravity. In the present embodiment, the direction of gravity is decomposed into components in the directions of the X axis, Y axis, and Z axis of the camera coordinate system 72. In other words, the direction of gravity is expressed by the X axis coordinate value, the Y axis coordinate value, and the Z axis coordinate value. Any length can be adopted as the length of the arrow 102 corresponding to the magnitude of gravity. In the present embodiment, it is assumed that the magnitude of gravity is 9.8. In the present embodiment, the coordinate values ($g_x$, $g_y$, $g_z$) of a vector in the direction of gravity indicated by the arrow 102 correspond to the orientation of the camera coordinate system 72 with respect to the direction of gravity. When the magnitude of the vector in the direction of gravity indicated by the arrow 102 is represented by a variable g, the following relationship (10) holds.

[Math. 5]

$$g=\sqrt{g_x^2+g_y^2+g_z^2} \tag{10}$$

For example, when the optical axis 6b of the lens of the camera 6 is parallel to the vertical direction, the coordinate values (0, 0, 9.8) of the vector indicated by the arrow 102 correspond to the orientation of the camera coordinate system 72 with respect to the direction of gravity. Next, in the present embodiment, setting information 63 for setting parameters corresponding to the orientation of the camera 6 with respect to the direction of gravity is predetermined. The parameter setting unit 53 sets parameters of the calculation model by using the orientation of the camera 6 with respect to the direction of gravity and the setting information 63. Table 1 shows a part of a table of parameter values corresponding to the orientation of the camera 6 as the setting information 63.

TABLE 1

| $g_x$ | $g_y$ | $g_z$ | fx |
|---|---|---|---|
| 9.8 | 0.0 | 0.0 | $f_{x1}$ |
| 9.0 | 3.9 | 0.0 | $f_{x2}$ |
| 8.0 | 5.7 | 0.0 | $f_{x3}$ |
| 7.0 | 6.9 | 0.0 | $f_{x4}$ |
| 6.0 | 7.7 | 0.0 | $f_{x5}$ |
| 5.0 | 8.4 | 0.0 | $f_{x6}$ |
| 4.0 | 8.9 | 0.0 | $f_{x7}$ |
| 3.0 | 9.3 | 0.0 | $f_{x8}$ |
| 2.0 | 9.6 | 0.0 | $f_{x9}$ |
| 1.0 | 9.7 | 0.0 | $f_{x10}$ |
| 9.0 | 3.0 | 2.5 | $f_{x11}$ |
| 9.0 | 2.0 | 3.3 | $f_{x12}$ |
| 9.0 | 1.0 | 3.7 | $f_{x13}$ |

In this case, values of the product $f_x$ of the focal length and the effective pixel size as an example of a parameter are shown. In the setting information 63 of this case, values of the products $f_{x1}$ to $f_{x13}$ which are parameters are predetermined for sets of coordinate values ($g_x$, $g_y$, $g_z$) which are variables indicating a plurality of discrete orientations of the camera 6.

The parameter setting unit 53 sets parameters of the calculation model based on the values of parameters determined for each orientation of the camera 6 with respect to the direction of gravity. For example, the parameter setting unit 53 acquires the products $f_x$ of two sets of coordinate values ($g_x$, $g_y$, $g_z$) closest to a set of coordinate values relating to the orientation of the camera 6 when the camera 6 captures an image. The parameter setting unit 53 can set the parameter by interpolating the two values of the product $f_x$ with the set of coordinate values relating to the orientation of the camera. Alternatively, parameters can be set through any method by using a table containing discrete parameter values. For example, a median value of the two parameter values corresponding to the two sets of coordinate values may be used or a parameter value corresponding to the closer of the sets of coordinate values may be used. Other parameters such as the product $f_y$, the image center variables c, and the distortion variables k and p can be set in a similar manner.

By using setting information including parameter values for discrete orientations of the camera, the parameter setting unit can set parameters corresponding to any orientation of the camera. The parameter setting unit can set parameters through simple calculation. Alternatively, even if it is difficult to set functions described below, parameters can be set in response to the orientation of the camera.

Subsequently, functions for calculating parameters in response to the orientation of the camera can be defined as setting information. Parameters can be calculated by mathematical expressions including variables relating to the orientation of the camera. For example, a function $f(g_x, g_y, g_z)$ for calculating a variable f with respect to variables $g_x$, $g_y$, and $g_z$, the variables being a set of coordinate values relating to the orientation of the camera, can be predetermined as shown in equation (11). Alternatively, a function $k(g_x, g_y, g_z)$ for calculating the distortion coefficients k with respect to the variables relating to the orientation of the camera can be predetermined as shown in equation (12).

[Math. 6]

$$f=f(g_x,g_y,g_z) \tag{11}$$

$$k=k(g_x,g_y,g_z) \tag{12}$$

For example, equations of higher degree of the variables $g_x$, $g_y$, and $g_z$ relating to the orientation of the camera can be adopted as such functions. The parameter setting unit 53 can set each parameter by using a function. The feature position calculating unit 55 can calculate the three-dimensional position of the feature portion based on the parameters set by the parameter setting unit 53.

Alternatively, machine learning for calculating parameters in response to the orientation of the camera may be adopted as the setting information. For example, the parameter setting unit acquires, as training data (labels), a large number of sets of the orientation of the camera with respect to the direction of gravity and parameter values corresponding to the orientation of the camera. The parameter setting unit generates a learning model by supervised learning. Then, the parameter setting unit may set parameter values from variables relating to the orientation of the camera by using the learning model.

In the above-described embodiment, the vector in the direction of gravity is decomposed into components in the X axis direction, Y axis direction, and Z axis direction of the camera coordinate system as variables indicating the orientation of the camera with respect to the direction of gravity, but the variables are not limited to this form. Any variable can be adopted as long as it represents the orientation of the camera with respect to the direction of gravity. For example, the coordinate values of the orientation of the camera coordinate system which are expressed by the coordinate values of the reference coordinate system 71 (coordinate values of the W axis, P axis, and R axis of the reference coordinate system 71) may be calculated as variables indicating the orientation of the camera with respect to the direction of gravity.

Figure 9:
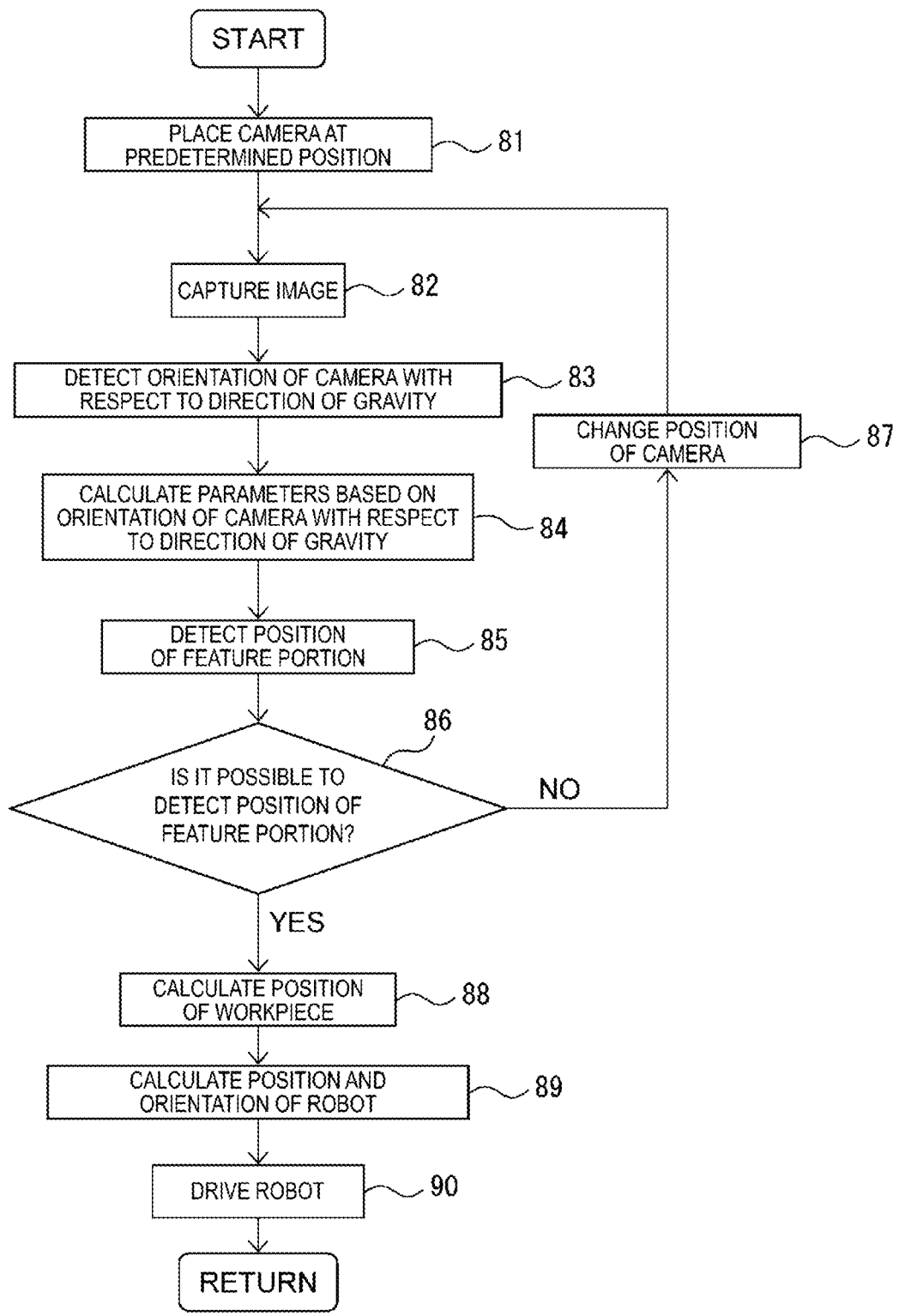
FIG. 9 is a flowchart for explaining control of the robot system.

FIG. 9 illustrates a flowchart of control according to the present embodiment. Referring to FIG. 1, FIG. 2 and FIG. 9, the operator determines setting information for setting the parameters of the calculation model. Then, the operator causes the storage part 42 to store the setting information 63. First, the control for gripping the workpiece 38 by the robot system 3 will be described as an example.

In step 81, the operation control unit 43 moves the camera 6 to a predetermined imaging position for imaging the workpiece 38. In the present embodiment, the camera 6 is arranged directly above the reference position of the workpiece 38. Next, in step 82, the focus adjustment mechanism 24 of the camera 6 brings the camera 6 into focus. The focus adjustment mechanism 24 of the present embodiment has an autofocus function and thus performs autofocusing. The imaging control unit 58 captures an image with the camera 6.

In step 83, the gravity direction detecting unit 51 detects the direction of gravity. For example, the gravity direction detecting unit 51 acquires coordinate values indicating the direction of gravity, expressed by coordinate values of the reference coordinate system 71, from the storage part 42. The orientation detecting unit 52 detects the orientation of the camera 6 based on the position and orientation of the robot 1. For example, the orientation detecting unit 52 can detect the orientation of the camera coordinate system 72 by using the coordinate values of the reference coordinate system 71. Next, the orientation detecting unit 52 detects the orientation of the camera with respect to the direction of gravity when the camera has captured an image.

In step 84, the parameter setting unit 53 sets parameters of a calculation model for calculating the three-dimensional position of the feature portion based on the variables relating to the orientation of the camera 6 and the setting information.

Next, in step 85, the feature detecting unit 54 detects a feature portion in the image by performing pattern matching. In this example, the pattern matching is performed by using a reference image of the edge portion 38c of the plate-like portion 38b, whereby an edge portion 38c in the image is detected. The feature position calculating unit 55 detects the position of the feature portion in the image.

Next, in the exemplary control of the present embodiment, control for changing the position of the camera 6 with respect to the workpiece 38 and capturing an image is performed when the position of the feature portion of the workpiece cannot be detected. For example, the feature portion may appear white due to reflection of light from illumination, thereby making the feature portion unclear. In such a case, it may be possible to clearly image the feature portion by moving the position of the camera.

In step 86, the image processing unit 50 determines whether or not the position of the feature portion has been detected. When the feature position calculating unit 55 cannot detect the position of the feature portion, control proceeds to step 87.

In step 87, the operation command generating unit 59 generates a command for changing the position of the camera 6. For example, the operation command generating unit 59 generates a command for translating the camera 6 in a predetermined direction by a predetermined movement amount. The operation command generating unit 59 can translate the camera 6 in a direction perpendicular to the Z axis of the camera coordinate system 72. Referring to FIG. 1, for example, the operation command generating unit 59 generates a command for moving the camera 6 in the X axis direction of the camera coordinate system 72.

The operation command generating unit 59 sends the operation command for the robot 1 to the operation control unit 43. The operation control unit 43 changes the position and orientation of the robot 1. Then, the control returns to step 82. The image processing unit 50 repeats the control from step 82 to step 86.

In step 86, when the feature position calculating unit 55 has detected the position of the feature portion, the control proceeds to step 88. The control may be stopped when the feature portion cannot be detected even after changing the position and orientation of the robot a plurality of times.

In step 88, the feature position calculating unit 55 calculates the three-dimensional position of the feature portion based on the position of the feature portion in the image. The feature position calculating unit 55 calculates the coordinate values of the reference coordinate system 71 based on the coordinate values of the image coordinate system 73 in the image. The feature position calculating unit 55 calculates the position of the workpiece based on the three-dimensional position of the feature portion. The position of the workpiece can be calculated, for example, in the reference coordinate system 71.

In step 89, the operation command generating unit 59 calculates the position and orientation of the robot 1 based on the position of the workpiece 38. Then, in step 90, the operation command generating unit 59 sends operation commands for driving the robot 1 to the operation control unit 43. The operation control unit 43 drives the robot 1 and the hand 5 based on the operation commands.

Referring to FIG. 2, FIG. 5 and FIG. 9, the same control as that illustrated in FIG. 9 can be performed when the first workpiece 38 is placed in the recessed portion 39a of the second workpiece 39. In step 81, the robot 1 arranges the camera 6 in a direction perpendicular to the surface of the workpiece 39. In step 82, the camera 6 captures an image of the surface of the workpiece 39. In step 83, the gravity direction detecting unit 51 detects the direction of gravity. The orientation detecting unit 52 detects the orientation of the camera with respect to the direction of gravity. In step 84, the parameter setting unit 53 calculates parameters of a calculation model based on the orientation of the camera 6 with respect to the direction of gravity.

Next, in step 85, the feature detecting unit 54 detects a feature portion of the workpiece in the image. For example, the position of a corner of the recessed portion 39a of the workpiece 39 is detected. The feature position calculating unit 55 detects the position of the feature portion in the image.

In step 86, the image processing unit 50 determines whether or not the position of the feature portion can be detected. If the position of the feature portion cannot be detected, the operation command generating unit 59 changes the position of the camera 6 in step 87. For example, the camera 6 is translated in a direction perpendicular to the Z axis of the camera coordinate system 72. The control from step 82 to step 86 is repeated after the position of the camera 6 is changed.

If the position of the feature portion can be detected in step 86, the feature position calculating unit 55 calculates the position of the second workpiece 39 in step 88. Then, the position and orientation of the robot 1 when the first workpiece 38 is placed are calculated based on the position of the second workpiece 39. In other words, the position and orientation of the robot 1 when the first workpiece 38 is inserted into the recessed portion 39a of the second workpiece 39 are calculated. Then, the robot is driven in step 90. The operation control unit 43 drives the robot 1 and the hand 5 based on the operation commands. The hand 5 releases the workpiece 38 after placing the first workpiece 38 in the recessed portion 39a.

The imaging device according to the present embodiment sets parameters of a calculation model for calculating a three-dimensional position corresponding to a specific position in an image captured by the vision sensor, in response to the orientation of the camera. Then, the three-dimensional position of the specific position is calculated based on parameters corresponding to the orientation of the vision sensor. By adopting this control, it is possible to accurately detect the three-dimensional position of the feature portion corresponding to the orientation of the camera. In particular, there is no need to fix the orientation of the camera with respect to the workpiece in advance and an image can be captured at any orientation of the camera according to the orientation of the workpiece and a three-dimensional position with a small error can be calculated. The imaging device of the present embodiment expands the range in which the robot can be driven and increases the number of patterns for driving the robot, compared to the technologies of the conventional art.

When the focus adjustment mechanism of the vision sensor has an automatically focusing function, the weight increases. Because there is a mechanism for moving the position of the lens, rattling of the mechanism inside the lens also increases. As a result, the change in the relative positional relationship of the lens with respect to the light-receiving element of the camera increases. Thus, when the camera has an automatically focusing function, the effects of the control according to the present embodiment are remarkable.

It should be noted that the vision sensor may not have the automatically focusing function. For example, a camera having a lens that is manually focused may be used. Alternatively, a camera having a lens with a fixed focus position may be used.

The robot system according to the present embodiment includes a robot as a movement device that moves the vision sensor. The robot can change the orientation of the camera. Even when the robot changes the orientation of the camera, the imaging device of the present embodiment can set parameters in response to the orientation of the camera and accurately detect the three-dimensional position of the workpiece.

Referring to FIG. 2, the display part 28 of the teach pendant 26 of the present embodiment displays the values of parameters set by the parameter setting unit 53. The operator can check the values of parameters displayed on the display part 28 of the teach pendant 26. In particular, when the three-dimensional position calculated by the feature position calculating unit 55 is incorrect, the operator can check the values of parameters set in response to the orientation of the camera 6.

Also, the parameter setting unit 53 of the present embodiment is formed so as to be able to set parameters where the influence of gravity is eliminated. Parameters where the influence of gravity is eliminated can be predetermined and stored in the storage part 42. The parameter setting unit 53 can acquire these parameters from the storage part 42.

The display part 28 of the present embodiment is formed so as to display the three-dimensional position of the feature portion calculated by using the parameters corresponding to the orientation of the camera with respect to the direction of gravity and the three-dimensional position of the feature portion calculated by using the parameters where the influence of gravity is eliminated. By adopting this configuration, the operator can check the magnitude of positional displacement due to the influence of gravity. The operator can check the magnitude of the influence of gravity upon the image.

The operator can also check the amount of positional displacement of the feature portion in the image or the amount of three-dimensional positional displacement of the workpiece. The operator can check the accuracy of the operation of the robot system.

In the above-described embodiment, parameters for converting a position in a two-dimensional image into a three-dimensional position are set based on the orientation of the camera with respect to the direction of gravity, but the embodiment is not limited to this. The parameter setting unit 53 can set parameters based on setting information including temperature as a variable.

Referring to FIG. 2, a temperature detector 31 for detecting the temperature of a body of the camera 6 is attached to the camera 6 in the robot system 3 of the present embodiment. The temperature is not limited to the temperature of the body of the camera 6 and any temperature relating to the temperature of the camera 6 can adopted. For example, the temperature of the lens or the air temperature around the robot system 3 may be adopted.

If the camera is driven for a long period of time, the temperature of electronic parts inside the camera may rise. Alternatively, the temperature of the motor that drives the lens may rise. As a result, the temperature of the body of the camera, the temperature of the lens, and the temperature of a support member that supports the lens or the like may change, and the distortion of the lens or the relative position of the sensor with respect to the lens may change. For this reason, the parameters of the calculation model may change as the temperature changes. Thus, the parameter setting unit 53 may set the parameters of the calculation model by using temperature as a variable in addition to the orientation of the camera with respect to the direction of gravity.

In a method of setting such parameters with temperature added as a variable, temperature can be added as a variable in addition to the variables of the orientation of the camera with respect to the direction of gravity as shown in Table 1. In other words, it is possible to create a table of values of parameters including temperature t as a variable in addition to the variables $g_x$, $g_y$, and $g_z$ of the coordinate values indicating the direction of gravity. Alternatively, parameters may be calculated by using a function $f(g_x, g_y, g_z, t)$ having the temperature t as a variable in addition to the variables $g_x$, $g_y$, and $g_z$ as exemplified in the following equation (13).

[Math. 7]

$$f=f(g_x,g_y,g_z,t) \tag{13}$$

By adopting this control, the three-dimensional position can be accurately calculated while taking into account the influence of temperature in addition to the orientation of the camera with respect to the direction of gravity. In particular, in the case of a camera including a liquid lens, the liquid lens is strongly affected by temperature. For example, the liquid lens is strongly affected by the temperature of the liquid because the curvature of the lens is changed by changing the surface tension. Therefore, the three-dimensional position can be accurately calculated by setting parameters of the calculation model based on the temperature in addition to the orientation of the camera.

In the embodiment described above, the workpiece is imaged while the camera is stationary, but the embodiment is not limited to this. The workpiece may be imaged while the camera is moving. For example, referring to FIG. 1, a conveyor for horizontally moving the workpiece 38 can be adopted instead of the pedestal 95.

In this case, the position and orientation of the robot 1 can be controlled such that the camera 6 follows the movement of the workpiece 38. For example, when the workpiece 38 is moved in the Y axis direction of the reference coordinate system 71 by the conveyor, the camera 6 captures an image while moving in the Y axis direction of the reference coordinate system 71. Then, the workpiece 38 may be gripped during a period in which the workpiece 38 moves. In such a case, the workpiece 38 may be imaged during a period in which the camera 6 accelerates or during a period in which the camera 6 decelerates. In other words, an image may be captured during a period in which acceleration is applied to the camera 6.

Referring to FIG. 2, the parameter setting unit 53 of the image processing unit 50 of the present embodiment can add the acceleration, which is applied to the camera 6 when an image is captured by the camera 6, to the gravitational acceleration. The acceleration detecting unit 56 calculates the position of the origin of the camera coordinate system 72 based on an output of the position detector 23. The acceleration detecting unit 56 calculates the acceleration applied to the camera coordinate system 72 based on the position of the origin of the camera coordinate system 72 and the time. In other words, the acceleration detecting unit 56 calculates the magnitude of the acceleration and direction of the acceleration applied to the camera 6.

The parameter setting unit 53 can decompose the acceleration applied to the camera coordinate system 72 into a component $a_x$ in the direction of the X axis, a component $a_y$ in the direction of the Y axis, and a component $a_z$ in the direction of the Z axis of the camera coordinate system 72. The coordinate axis components $g'_x$, $g'_y$, and $g'_z$ of the acceleration applied to the camera coordinate system 72, which combine the acceleration due to the movement of the camera and the gravitational acceleration, can be represented by the following equations (14) to (16).

[Math. 8]

$$-a_x + g_x = g'_x \quad (14)$$

$$-a_y + g_y = g'_y \quad (15)$$

$$-a_z + g_z = g'_z \quad (16)$$

In this way, it can be determined for the camera 6 that the acceleration with the coordinate values ($g'_x$, $g'_y$, $g'_z$) in the camera coordinate system 72 is applied to the camera 6. The parameter setting unit 53 can set the values of the variables f', c', k', and p', which are parameters, based on the variables $g'_x$, $g'_y$, and $g'_z$ and the setting information as shown in Table 1. Alternatively, the parameter setting unit 53 can calculate the variables f', c', k', and p' which are parameters of the calculation model from the variables $g'_x$, $g'_y$, and $g'_z$ based on the functions shown in equations (11) and (12). Then, the feature position calculating unit 55 can calculate the three-dimensional position of the feature portion based on the calculated parameters of the calculation model.

By performing control for adding the acceleration applied to the camera 6 with driving of the robot 1 to the gravitational acceleration, the three-dimensional position can be accurately detected even if the image is captured while the camera is accelerating or decelerating.

In the above-described embodiment, parameters of a calculation model are calculated based on the direction of gravity and a position in a two-dimensional image captured by the camera is converted into a three-dimensional position by using the calculated parameters, but the embodiment is not limited to this. Variables f', c', k', and p' which are parameters may be calculated based on the direction of gravity detected by the gravity direction detecting unit 51 and the position in the image represented in the two-dimensional image coordinate system 73 may be corrected by using these parameters. Then, the corrected position in the image represented in the two-dimensional image coordinate system 73 may be converted into a three-dimensional position by using parameters where the influence of gravity is eliminated.

For example, the coordinate values ($u_1$, $v_1$) of an arbitrary position of a feature portion in a two-dimensional image may be converted into coordinate values ($u_1'$, $v_1'$) of a corrected position based on the variables f', c', k', and p' which are parameters where the influence of gravity is taken into account. In other words, it can be converted into a two-dimensional image obtained when there is no influence of gravity. Next, a three-dimensional position can be calculated based on the coordinate values (u1', v1') in the image by using the parameters of the calculation model where the influence of gravity is eliminated. In this way, it is possible to perform image processing for converting an image acquired by a camera into an image where the influence of gravity is eliminated. After this, the three-dimensional position can be calculated based on the position in the image by using the parameters where the influence of gravity is eliminated. By adopting this method, it is also possible to accurately detect the three-dimensional position.

Although the robot 1 changes the orientation of the camera 6 in the above-described embodiment, the embodiment is not limited to this. The position and orientation of the camera may be fixed. Also, the movement device that changes the orientation of the camera is not limited to a robot and any device that changes the orientation of the camera can be adopted.

In each control described above, the order of steps can be changed as appropriate within a range in which the functions and operations are not changed. The above-described embodiments can be combined as appropriate. In each of the above figures, the same reference numerals are given to the same or equivalent parts. The above-described embodiments are examples and do not limit the invention. The embodiments also include modifications of the embodiments indicated in the claims.

REFERENCE SIGNS LIST

1: robot
2: controller
3 robot system
6: camera
6b optical axis
23 position detector
24: focus adjustment mechanism
26 teach pendant
28: display part
31 temperature detector
38, 39 workpiece
38c: edge portion
39a recessed portion
40: controller body
42: storage part
50 image processing unit
51 gravity direction detecting unit
52 orientation detecting unit
53: parameter setting unit
54: feature detecting unit 55: feature position calculating unit
56 acceleration detecting unit
63: setting information
66, 67: image
68, 69 image of workpiece
71 reference coordinate system
72 camera coordinate system
73 image coordinate system
74 tool coordinate system

The invention claimed is:

1. An imaging device comprising:
a vision sensor configured to capture an image of a target object;
a gravity direction detecting unit configured to detect a direction of gravity;
an orientation detecting unit configured to detect an orientation of the vision sensor with respect to the direction of gravity;
a parameter setting unit configured to set a parameter for calculating a three-dimensional position corresponding to a specific position in the image captured by the vision sensor;
a storage part configured to store setting information for setting the parameter corresponding to the orientation of the vision sensor;
a feature detecting unit configured to detect a feature portion predetermined in the image of the target object; and
a feature position calculating unit configured to calculate the three-dimensional position of the feature portion by using the parameter set by the parameter setting unit,
wherein the parameter setting unit is configured to set the parameter based on the direction of gravity, the orientation of the vision sensor, and the setting information.

2. The imaging device of claim 1, wherein the parameter setting unit is configured to change a value of the parameter in response to the orientation of the vision sensor when the orientation of the vision sensor changes.

3. The imaging device of claim 1, comprising a robot configured to change the orientation of the vision sensor,
wherein the orientation detecting unit is configured to detect the orientation of the vision sensor with respect to the direction of gravity, based on a position and orientation of the robot and a position of the vision sensor in the robot to which the vision sensor is attached.

4. The imaging device of claim 1, comprising a temperature detector configured to detect temperature,
wherein the parameter setting unit is configured to set the parameter based on the direction of gravity, the orientation of the vision sensor, temperature, and the setting information.

5. The imaging device of claim 1, comprising:
a robot configured to change the orientation of the vision sensor; and
an acceleration detecting unit configured to detect an acceleration of the vision sensor when the robot is driven,
wherein the parameter setting unit is configured to set the parameter based on the direction of gravity, the acceleration of the vision sensor, the orientation of the vision sensor, and the setting information.

6. The imaging device of claim 1, wherein the vision sensor has an automatically focusing function.

7. The imaging device of claim 1, comprising
a display part configured to display the three-dimensional position of the feature portion calculated by the feature position calculating unit,
wherein the parameter setting unit is formed so as to set the parameter where an influence of gravity is eliminated, and
the display part is formed so as to display the three-dimensional position of the feature portion calculated by using the parameter set based on the direction of gravity and the orientation of the vision sensor, and the three-dimensional position of the feature portion calculated by using the parameter where the influence of gravity is eliminated.

8. The imaging device of claim 1, comprising a display part configured to display a value of the parameter set by the parameter setting unit.

* * * * *